Figure 1:
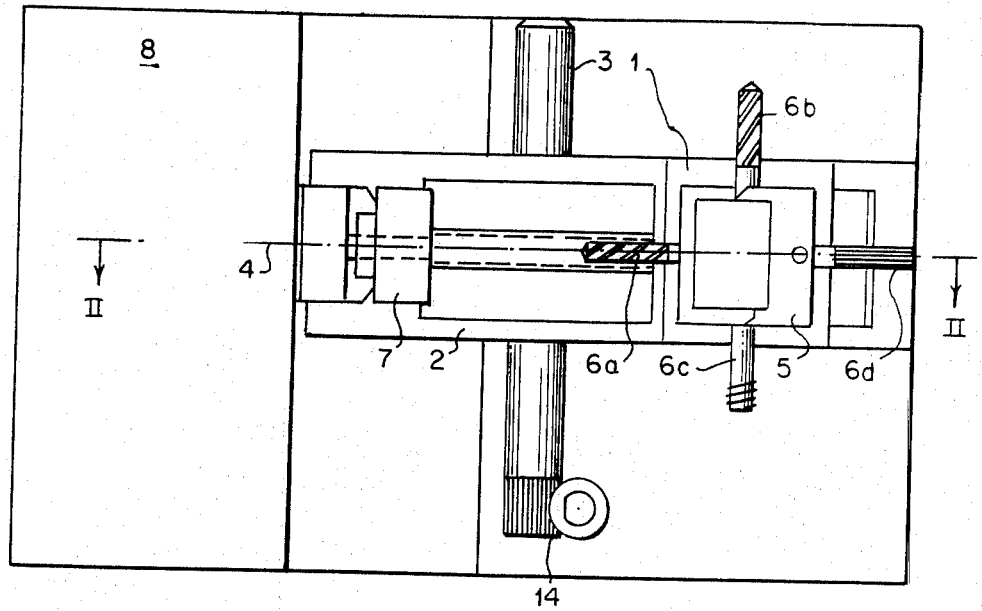

United States Patent
Walk

[15] 3,691,613
[45] Sept. 19, 1972

[54] MACHINE TOOL WITH PIVOTABLE TOOL CARRIAGE

[72] Inventor: Georg Walk, Rheydt, Germany

[73] Assignee: A Monforts, Monchengladbach, Germany

[22] Filed: Jan. 28, 1970

[21] Appl. No.: 6,507

[30] Foreign Application Priority Data

Jan. 30, 1969 Germany..........P 19 04 457.6

[52] U.S. Cl..........................29/27 C, 29/39, 29/65, 82/24
[51] Int. Cl. ..................................B23b 3/16
[58] Field of Search...........29/27 C, 48.5, 39, 44, 65; 82/36.1, 21, 24

[56] References Cited

UNITED STATES PATENTS

| | | | |
|---|---|---|---|
| 2,148,348 | 2/1939 | Groene et al. | 29/65 X |
| 2,334,616 | 11/1943 | Fiorelli | 82/24 |
| 2,466,596 | 4/1949 | Krause | 82/36 A |
| 2,956,454 | 10/1960 | Hansen | 29/568 X |
| 2,857,796 | 10/1958 | Jeanneret | 29/65 X |
| 2,505,685 | 4/1950 | McClernon | 82/36.1 X |
| 3,486,209 | 12/1969 | Shultz et al. | 29/27 C |

FOREIGN PATENTS OR APPLICATIONS

| | | | |
|---|---|---|---|
| 841,112 | 6/1952 | Germany | 82/24 |
| 597,008 | 1/1948 | Great Britain | 29/39 |

Primary Examiner—Andrew R. Juhasz
Assistant Examiner—Z. R. Bilinsky
Attorney—Curt M. Avery, Arthur E. Wilfond, Herbert L. Lerner and Daniel J. Tick

[57] ABSTRACT

Machine tool includes a machine frame, a rotary spindle mounted on the frame, workpiece-clamping chuck means carried by the spindle, elongated guide means pivotally mounted on the frame, and a single tool carriage guidingly displaceable along the length of the guide means and adjustable with the aid of the pivotable guide means into positions wherein tools carried by the carriage can selectively machine a workpiece clamped in the chuck means in directions longitudinal to the axis of the rotary spindle and transverse and inclined thereto.

2 Claims, 4 Drawing Figures

MACHINE TOOL WITH PIVOTABLE TOOL CARRIAGE

My invention relates to machine tool and more particularly to machine tool having a spindle for a workpiece chuck and means for holding tools so that they are capable of machining the workpiece in directions longitudinal, transverse and inclined with respect to the axis of the spindle.

It has been known heretofore from the U.S. Pat. No. 1,878,628 to provide a lathe with several carriages carrying tools for facing and longitudinally and diagonally machining a workpiece, the carriages being pivotable about a respective axis.

As known, a large number of carriages and guides are required for effecting the different types of machining operations. However, a large number of such different members is undesired due to the resulting greater susceptibility to wear. Moreover, the heretofore known carriages employed are adjustable only about a relatively small angle and at relatively great cost.

It is accordingly an object of my invention to provide machine tool with pivotable tool carriage having relatively high machining accuracy and capable of machining a workpiece in directions longitudinal, transverse and inclined to the axis of the spindle on which the workpiece chuck is mounted, which avoids the heretofore required large number of tool carriages.

With the foregoing and other objects in view I provide, in accordance with my invention, a machine tool comprising a machine frame, a rotary spindle mounted on the frame, workpiece-clamping chuck means carried by the spindle, elongated guide means pivotally mounted on the frame, and a single tool carriage guidingly displaceable along the length of the guide means and adjustable with the aid of the pivotable guide means into positions wherein tools carried by the carriage can selectively machine a workpiece clamped in the chuck means in directions longitudinal to the axis of the rotary spindle and transverse and inclined thereto.

In accordance with a further feature of my invention, the pivot range of the carriage guide means is at least 90° so that the carriage is selectively displaceable in directions parallel, perpendicular and inclined to the axis of the spindle during a machining operation when the guide means is suitably pivoted. The guide means proper for the carriage is pivotable about an axis disposed perpendicularly to the axis of the chuck-carrying spindle.

Due to the relatively large pivot range of the carriage guide means all of the aforementioned machining operations can be effected with tools carried by a single carriage adjustable as a longitudinal, transverse or inclined carriage. By eliminating the heretofore required large number of carriages and guides, the susceptibility to wear is reduced, the machining accuracy is increased and manufacturing costs are minimized.

In accordance with a further feature of my invention, I provide index pin means for fixing the carriage guide means with respect to the machine frame at predetermined positions of the guide means whereby the guide means is able to be fixed firmly, free of play and wear in all angular positions of the pivot range for machining the workpiece. More specifically, in accordance with my invention, the carriage guide means is indexible by indexing pins at least in both end locations of the pivot range of the guide means.

In accordance with yet another feature of the invention, at least one tool holder in the form of a turret rotatable with respect to the carriage or an automatic multipoint tool is mounted on the carriage for holding the tools.

A very significant advantage is derived from this construction in that the tools provided for various machining operations within the pivot range of the carriage means cannot interfere with one another. Consequently, in a single setting of a workpiece, respectively, a number of single-point or multipoint tool machining operations can be carried out in sequence.

Other features which are considered as characteristic for the invention are set forth in the appended claims.

Although the invention is illustrated and described herein as embodied in machine tool with pivotable tool carriage, it is nevertheless not intended to be limited to the details shown, since various modifications and structural changes may be made therein without departing from the spirit of the invention and within the scope and range of equivalents of the claims.

Figure 2:
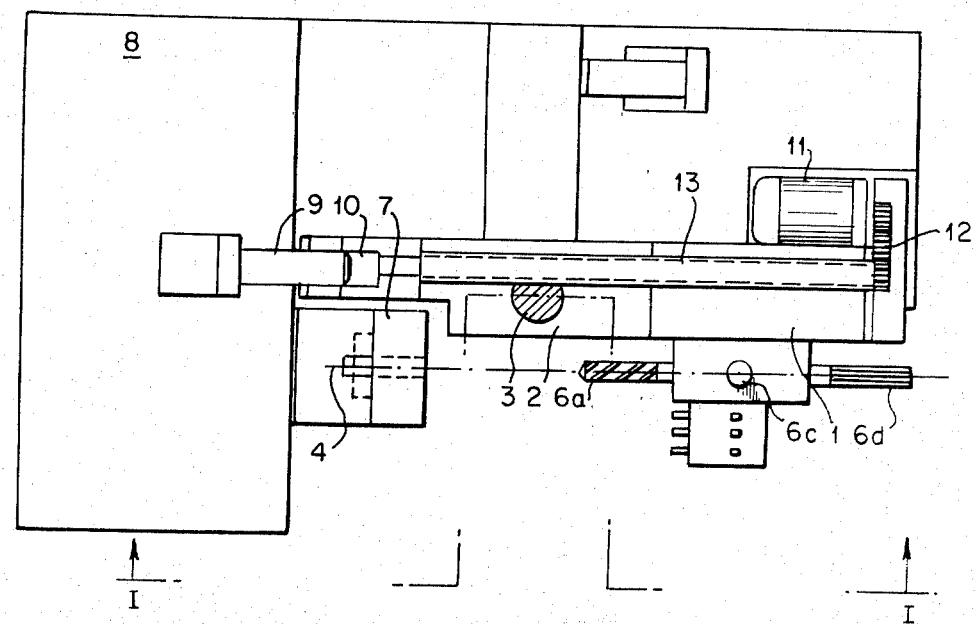
Figure 3:
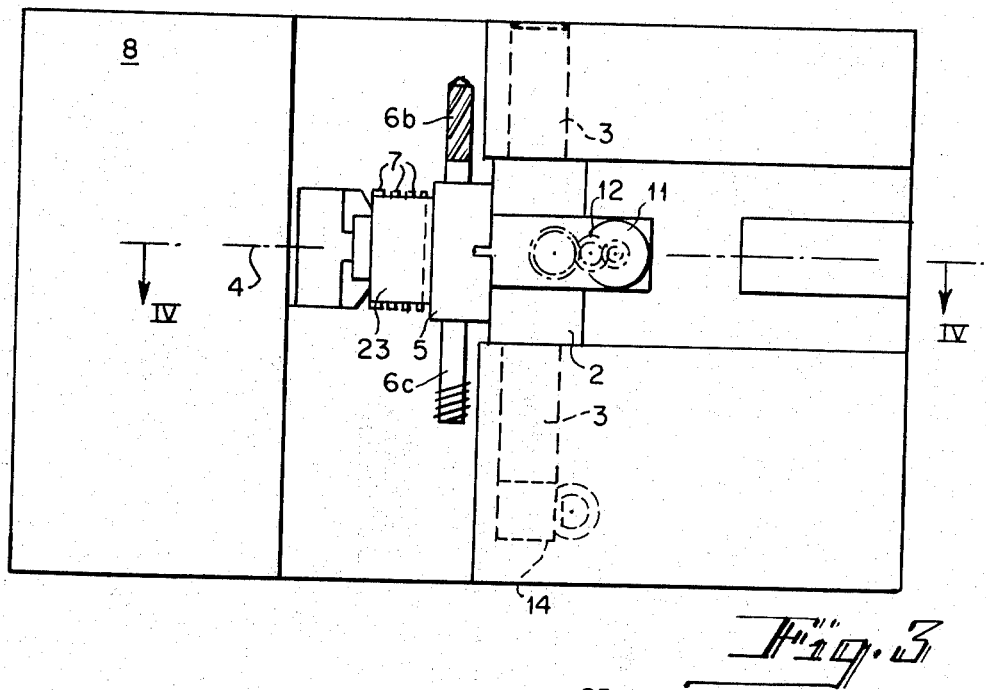
Figure 4:
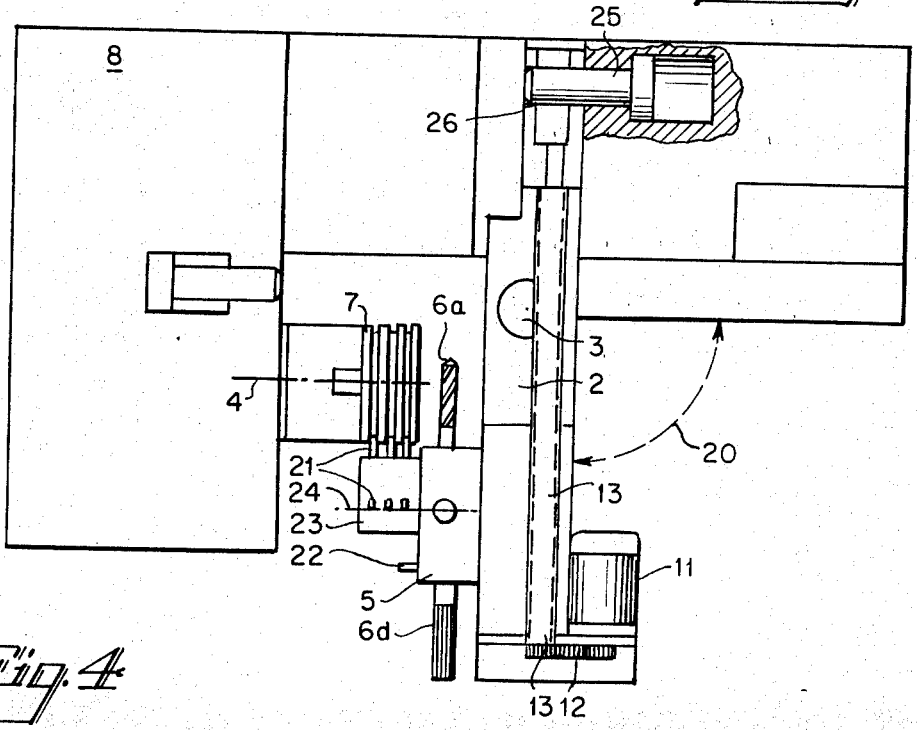

The construction and method of operation of the invention, however, together with additional objects and advantages thereof will be best understood from the following description of specific embodiments when read in connection with the accompanying drawings, in which:

FIGS. 1 and 2 are diagrammatic elevational and top plan views, FIG. 2 being partly in section along the line II—II of FIG. 1, of machine tool with pivotal tool carriage according to my invention wherein the tool carriage is shown disposed parallel to the axis of the spindle on which the workpiece chuck is mounted; and FIGS. 3 and 4 are views corresponding to FIGS. 1 and 2, respectively, of the same machine tool showing the tool carriage disposed perpendicularly to the axis of the spindle, FIG. 4 being partly in section along the line IV—IV in FIG. 3.

In all of the figures, corresponding members are identified by the same reference characters.

Referring now to the drawings and first particularly to FIGS. 1 and 2 thereof, there is shown a tool-carrying sliding carriage 1 slidably mounted in a guide 2 and rotatable therewith about a longitudinal pivot shaft 3 so that both the carriage 1 and the guide 2 extend parallel to the axis 4 (FIG. 2) of the spindle of the illustrated machine tool on which there is mounted a chuck clamping a workpiece 7. A revolving turret 5 is mounted on the sliding carriage 1 and is provided with a number of tools 6a to 6d (four in number in the illustrated embodiment).

In the position of the carriage 1 shown in FIGS. 1 and 2, all of the tools 6a to 6d are able to be used in sequence for machining the workpiece 7 by suitably rotating the turret 5. The spindle carrying the workpiece chuck is rotatably mounted in the frame or housing 8 of the machine tool and is suitably driven therein through conventional means, such as belt or gear transmission. The position of the slide 2 is fixed as shown in FIG. 2 by an index pin 9 slidably mounted on the machine frame or housing 8 and suitably inserted into a bore 10 formed in the carriage guide 2. The pin 9 can, of course, be inserted manually into the bore 10, however, other means can be provided for effecting the insertion of the pin 9, such as for example by subjecting a piston at the end of the pin to hydraulic pressure within a cylinder, as shown diagrammatically in FIG. 2.

A motor 11 is provided with the guide 2 and secured thereto so as to be pivoted therewith. A gear transmission 12 transmits rotation from the suitably energized motor 11 to a threaded spindle 13 for displacing the carriage 1 in the axial direction of the drive spindle 13 along the guide 2 in a conventional manner. A suitably energizable drive 14 in the form of a gear transmission is actuatable by operator of the machine tool in a conventional manner to turn the pivot shaft 3 and accordingly the carriage guide 2 which is fixed thereto.

In the views of FIGS. 3 and 4, the carriage guide 2 is shown in a position in which it is pivoted at an angle of 90°, as represented by the double-headed arrow 20, with respect to the position thereof shown in FIGS. 1 and 2. In FIGS. 3 and 4, instead of the tools 6a and 6d, one of the tools 21 and 22, respectively, comes into machining contact with the workpiece 7. The tools 21 are held by tool holder 23 constructed in the form of a turret and mounted on the turret 5 which is in turn mounted on the carriage 1. The turret-like tool holder 23 can either be rotated relative to the turret 5 or, if desired, can be fixed with respect to the turret 5 and consequently rotated therewith about the axis 24. The tools 21 can be provided, for example for internal machining such as the cutting of grooves or threads, and the tool 22 which is mounted on the turret 5, can be employed, for example, for performing a facing operation. The position of the carriage guide 2 as shown in FIGS. 3 and 4 is able to be fixed by an index pin 25 of similar construction and operation as the index pin 9 and received in a bore 26 formed in the guide 2.

In the figures, only two positions of the carriage guide 2 are illustrated. Obviously, the tool machine can also be constructed so that the carriage guide 2 is adjustable in a greater number of fixed angular positions within the pivot range thereof. Additional indexing pins can be provided for the added positions in which the guide can be adjustably fixed. In many cases, the carriage guide 2 can be adequately fixed only by the engagement of the guide transmission 14 for the pivot shaft 3 without requiring index pins. It is noted also that the pivot shaft 3 does not have to be turned itself in all cases but it can serve merely as a bearing for the guide 2 about which the guide 2 can be turned by any suitable means such as, for example, by manual means, if desired.

I claim:

1. Machine tool comprising a machine frame, a rotary spindle mounted on said frame, workpiece-clamping chuck means carried by said spindle, elongated guide means pivotally mounted on said frame, a single tool carriage guidingly displaceable along the length of said guide means, and at least one tool holder in the form of a turret mounted on said carriage, said tool holder being rotatable relative to said carriage about an axis perpendicular to the pivot axis of said guide means and adjustable with the aid of said pivotable guide means into positions wherein tools carried by said carriage can selectively machine a workpiece clamped in said chuck means in directions longitudinal to the axis of said rotary spindle and transverse and inclined thereto, said carriage guide means is pivotable through a range of at least 90° so that said carriage is selectively displaceable in directions parallel, perpendicular and inclined to the axis of said rotary spindle, and including index pin means comprising an index pin carried by said machine frame and slidable into a recess formed in said carriage guide means for fixing said carriage guide means with respect to said machine frame at predetermined angular positions of said carriage guide means.

2. Machine tool according to claim 1 including a first tool holder in the form of a tool-carrying turret mounted on said carriage and rotatable relative thereto, and a second tool holder in the form of a tool-carrying turret mounted on said first tool holder and rotatable relative to said first tool holder and said carriage.

* * * * *